(12) United States Patent
Akman et al.

(10) Patent No.: US 12,356,319 B2
(45) Date of Patent: Jul. 8, 2025

(54) ACCESS NETWORK INTELLIGENT CONTROLLER FOR MULTIPLE TYPES OF ACCESS NETWORKS

(71) Applicant: Juniper Networks, Inc., Sunnyvale, CA (US)

(72) Inventors: Arda Akman, San Ramon, CA (US); Burcu Sahin, Ankara (TR)

(73) Assignee: Juniper Networks, Inc., Sunnyvale, CA (US)

( * ) Notice: Subject to any disclaimer, the term of this patent is extended or adjusted under 35 U.S.C. 154(b) by 416 days.

(21) Appl. No.: 17/809,650

(22) Filed: Jun. 29, 2022

(65) Prior Publication Data
US 2023/0007576 A1     Jan. 5, 2023

Related U.S. Application Data

(60) Provisional application No. 63/202,928, filed on Jun. 30, 2021.

(51) Int. Cl.
*H04W 48/18* (2009.01)
*H04W 76/10* (2018.01)

(52) U.S. Cl.
CPC ........... *H04W 48/18* (2013.01); *H04W 76/10* (2018.02)

(58) Field of Classification Search
CPC ... H04W 84/042; H04W 40/12; H04W 40/04; H04W 84/12; H04L 43/0882; H04L 45/123; H04L 45/24
See application file for complete search history.

(56) References Cited

U.S. PATENT DOCUMENTS 12,192,820 B2 * 1/2025 Yeh .................. G06N 3/045
2018/0213461 A1 * 7/2018 Grayson ............. H04L 45/24
(Continued)

FOREIGN PATENT DOCUMENTS

EP     3627883 A1    3/2020

OTHER PUBLICATIONS

3GPP TS 23.501, "3rd Generation Partnership Project 2021, Technical Specification Group Services and System Aspects; System architecture for the 5G System (5GS); Stage 2 (Release 17)", 3GPP A Global Initiative, vol. 17, No. 1, Jun. 2021, 526 pp.
(Continued)

*Primary Examiner* — Mahran Y Abu Roumi
(74) *Attorney, Agent, or Firm* — Shumaker & Sieffert, P.A.

(57) ABSTRACT

An example system includes an access network intelligent controller comprising processing circuitry configured to communicate with a 3GPP access network control function and a non-3GPP access network control function. The non-3GPP access network control function comprises a first plurality of controllable functions. The 3GPP access network control function comprises a second plurality of controllable functions. The access network intelligent controller is configured to execute one or more applications, each application of the one or more applications configured to: issue a subscription request for a subscription to a first controllable function of the first plurality of controllable functions of the non-3GPP access network control function or a second controllable function of the second plurality of controllable functions of the 3GPP access network control function, and exchange messages with the first controllable function or the second controllable function in accordance with the subscription.

20 Claims, 13 Drawing Sheets

(56) References Cited

U.S. PATENT DOCUMENTS

| | | | |
|---|---|---|---|
| 2020/0267784 A1* | 8/2020 | Bharatia | H04L 65/1016 |
| 2021/0153002 A1* | 5/2021 | Zhou | H04W 48/18 |
| 2022/0014963 A1* | 1/2022 | Yeh | G06N 3/045 |
| 2022/0124850 A1* | 4/2022 | Gundavelli | H04L 61/103 |
| 2022/0131910 A1* | 4/2022 | Baskaran | H04L 65/1104 |
| 2023/0164623 A1* | 5/2023 | Perez Martinez | H04L 65/80 370/329 |

OTHER PUBLICATIONS

5G Americas, "The 5G Evolution: 3GPP Releases 16-17", Jan. 2020, 54 pp.

Broadband Forum, "Introduction to 5G Wireless Wireline Convergence", WWC Work Area, Aug. 2020, 40 pp.

Broadband Forum, "TR-456 AGF Functional Requirements", Technical Report, Aug. 2020, 108 pp.

ETSI TS 138 413, "5G; NG-RAN; NG Application Protocol (NGAP)", Technical Specification, vol. 16, No. 4, Jan. 2021, 465 pp.

O-RAN.WG3.E2AP-V02.00, "O-RAN Working Group 3, Near-Real-time RAN Intelligent Controller, E2 Application Protocol (E2AP)", Technical Specification, Jan. 2020, 92 pp.

O-RAN.WG3E2GAP et al., "O-RAN Working Group 3, Near-Real-time RAN Intelligent Controller Architecture & E2 General Aspects and Principles", O-Ran Alliance, vol. 1, No. 1, Feb. 2020, 36 pp.

ORAN-WG3.E2AP-V01.00.00, "O-RAN Working Group 3, Near-Real-time RAN Intelligent Controller, E2 Application Protocol (E2AP)", O-Ran Alliance, Technical Specification, Jan. 2020, 66 pp.

Response to Extended Search Report dated Dec. 2, 2022, from counterpart European Application No. 22182297.6, filed Jul. 4, 2023, 25 pp.

3GPP, "3rd Generation Partnership Project; Technical Specification Group Services and System Aspects; Study on Access Traffic Steering, Switching and Splitting support in the 5G system architecture (Release 16)", 3GPP TR 23.793, vol. 6.0, Aug. 13, 2018, pp. 1-80.

Extended Search Report from counterpart European Application No. 22182297.6 dated Dec. 2, 2022, 13 pp.

Huawei, "Clarification of Access Availability Report via N4", 3GPP Draft; S2-1908990 Clarification of Access Availability Report via N4, 3rd Generation Partnership Project (3GPP), Mobile Competence Centre, vol. SA WG2, No. Split, Route Des Lucioles, Croatia, Oct. 4, 2019, 4 pp.

* cited by examiner

ACCESS NETWORK INTELLIGENT CONTROLLER FOR MULTIPLE TYPES OF ACCESS NETWORKS

RELATED APPLICATION

This application claims the benefit of U.S. Provisional Application No. 63/202,928, filed Jun. 30, 2021, the entire contents of which is incorporated herein by reference.

TECHNICAL FIELD

The disclosure relates to computer networking, and controlling access network control functions of access networks.

BACKGROUND

Computer networks have become ubiquitous and the number of network applications, network-connected devices, and types of network-connected devices rapidly expanding. Such devices now include computers, smart phones, Internet-of-Things (IoT) devices, cars, medical devices factory equipment, etc. An end-user network-connected device typically cannot directly access a public network such as the Internet. Instead, an end-user network device establishes a network connection with an access network, and the access network communicates with a core network that is connected to one or more packet data networks (PDNs) offering services. There are several different types of access networks currently in use. Examples include Radio Access Networks (RANs) that are access networks for 3rd Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The core network may be that of a mobile service provider network, such as a 3G, 4G/LTE, or 5G network.

SUMMARY

In general, the disclosure describes techniques for controlling different types of access networks and merging capabilities of different access networks. As noted above, different end user devices may use different types of access networks to access a core network. These different access networks have different capabilities, functions, network stacks, application programming interfaces (APIs) etc. Further, each type of access network is typically configured and controlled by different management entities, making it difficult to provide consistent services, consistent reporting, and common user interfaces across the different access networks.

This lack of consistency can be a barrier to providing new services and integrated services across different access networks. As an example, authentication entities may be different across different access networks. Thus, an operator of different access networks may require users that migrate from a first access network owned by the operator to a second access network owned by the operator to reauthenticate before being allowed to use the second access network. The authentication requirements of the second network may be different from the first network, requiring the user to maintain multiple authentication credentials for each of the different access networks. This can be frustrating for the user, leading to a poor user experience.

The lack of consistency of service interfaces can be a barrier to providing new services, or extending existing services to different access networks. As an example, network slicing is an end-to-end service that involves an access network. In network slicing, a network operator multiplexes multiple independent virtual networks on the same physical network infrastructure. Network slices can be optimized according to capacity, coverage, connectivity, security and performance requirements of various users and applications. Because the slices can be isolated from each other, as if they are physically separated both in the control and user planes, the user experience of the network slice can be the same as if it was a separate physical network. However, current systems are limited with respect to the scope of network slicing. For example, current systems are typically limited to providing slices across a single access network.

The techniques disclosed herein include an access network intelligent controller that provides a platform for applications that can provide various services across different types of access networks. The applications of the access network intelligent controller described herein can interface with various controllable functions of access network control functions. The access network control function can expose a service model that describes the services provided by the access network control function and its controllable functions. Applications can subscribe to the services. The techniques can enable network operators to achieve unified control in different access networks, in some cases simultaneously.

The techniques disclosed herein can provide a technical advantage over previous systems by enabling applications of an access network intelligent controller to control many different types of access networks using common interfaces. As a practical application of the techniques described in this disclosure, the access network intelligent controller and access network agent enable applications that provide services using the resource of multiple access networks managed by an operator. As an example, applications integrated with the access network intelligent controller can provide fine-grained common control to authentication services, network slicing services, resource management services etc. that can utilize resources provided by multiple access networks rather than just one access network. Thus, the access network intelligent controller can provide a platform for applications that can control both the access side and core side stack of multiple types of access networks and core networks, such as 5G core networks. As but one example, the service-oriented view of access networks and core networks facilitates software-defined networking (SDN) and network function virtualization (NFV) that allow the implementation of flexible and scalable network services on top of differing underlying network infrastructures.

In one example, a system includes an access network intelligent controller comprising processing circuitry configured to communicate with a 3GPP access network control function and a non-3GPP access network control function, wherein: the non-3GPP access network control function comprises a first plurality of controllable functions; the 3GPP access network control function comprises a second plurality of controllable functions; and the access network intelligent controller is configured to execute one or more applications, each application of the one or more applications configured to: issue a subscription request for a subscription to a first controllable function of the first plurality of controllable functions of the non-3GPP access network control function or a second controllable function of the second plurality of controllable functions of the 3GPP access network control function, and exchange messages with the first controllable function or the second controllable function in accordance with the subscription.

In another example, a method includes instantiating, by an access network intelligent controller comprising processing circuitry configured to communicate with a 3GPP access network control function and a non-3GPP access network control function, one or more applications; issuing, by an application of the one or more applications, a subscription request for a subscription to a first controllable function of a first plurality of controllable functions of the non-3GPP access network control function or a second controllable function of a second plurality of controllable functions of the 3GPP access network control function; and exchanging messages with the first controllable function or the second controllable function in accordance with the subscription.

The details of one or more examples are set forth in the accompanying drawings and the description below. Other features, objects, and advantages will be apparent from the description and drawings, and from the claims.

DETAILED DESCRIPTION

Figure 1:
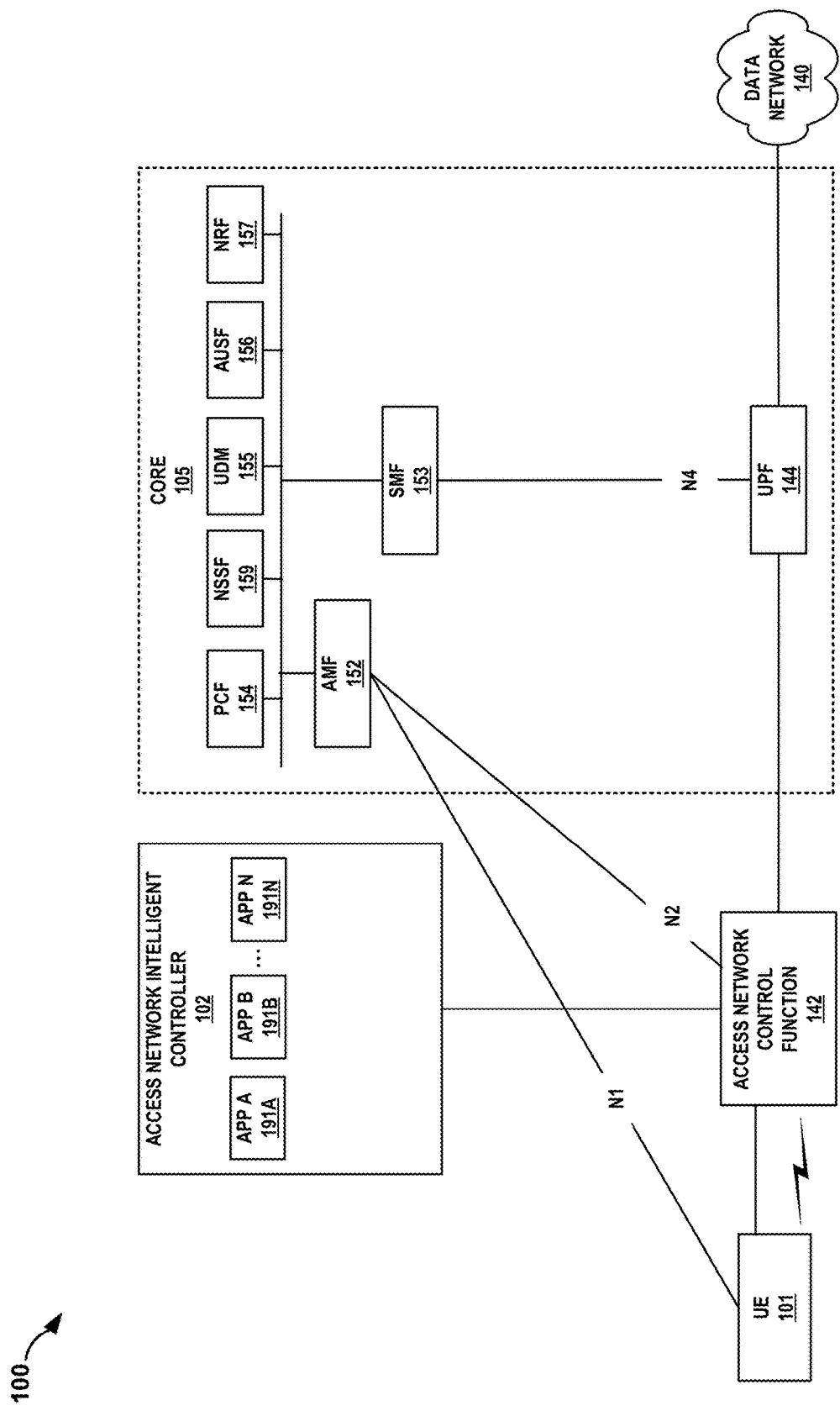
FIG. 1 is a block diagram illustrating an example network system, according to techniques of the disclosure.

FIG. 1 is a block diagram illustrating an example network system, according to techniques of the disclosure. The example network system 100 implements control plane user plane separation (CUPS). CUPS refers to the separation between network management functions from network traffic forwarding functions. For example, control plane functions can include user connection management, route determination, Quality of Service (QoS) policy definition and enforcement, user authentication, etc. User plane functions typically include functions that forward network traffic from one node to another. CUPS can be beneficial because it can facilitate scaling of use plane functionality separately from control plane functionality.

In the example shown in FIG. 1, components of a control plane and a user plane of network system 100 conform to 5th generation mobile network ("5G") specifications as published by 3GPP. The user plane can include components that communicatively attach user equipment (UE) 101 to data network 140. In some aspects, data network 140 can be the Internet. UE 101 can be an end-user network device that communicates with other network devices on data network 140 via an operator's access network. Examples of UE 101 can be a device that communicates with data network 140 via a wireless access network such as a 3GPP network. Such devices can include smartphones, laptops, tablet computers, Internet-of-Things devices, autonomous vehicles, etc. Additionally, UE 101 can be a device that communicates with data network 140 via a wired access network. Such devices can include residential gateways such as cable modems, DSL modems, wireless routers, network switches, Voice over Internet Protocol (VoIP) analog telephone adapters, wireless access points, wired routers etc. The techniques disclosed herein are not limited to any particular type of UE 101.

In some aspects, network system 100 includes access network control function 142 that provides, to UE 101, an interface to an access network. Various types of access networks, both wireless and wired, may be present in network system 100. Examples of such networks include 3GPP wireless networks, untrusted non-3GPP networks, trusted non-3GPP networks, and wired networks (also referred to as "fixed networks"). Examples of wired networks include DSL networks, Cable networks, and Passive Optical Networks (PONs). Access network control function 142 may be specialized to the type of access network. For example, access network control function 142 may be a gNodeB in 3GPP access networks. Access network control function 142 may be a Non-3GPP Interworking Function (N3IWF) in untrusted non-3GPP access networks. Access network control function 142 may be a Trusted Network Gateway Function (TNGF) or Trusted Wireless Local Area Network (WLAN) Interworking Function (TWIF) in trusted non-3GPP access networks. Access network control function 142 may be a Wireline Access Gateway Function (W-AGF) in wired access networks. Access network control function 142 may also communicate with at least one User Plane Function (UPF) 144 of core 105. UPF 144 can provide an interconnection between downstream devices such as UE 101 and data network 140 via access network control function 142. As such, UPF 144 can provide packet routing and forwarding, policy enforcement, and data buffering services.

In some aspects, network system 100 includes a core 105 that implements various discrete control plane functions for network system 100. In some aspects, core 105 includes 5G control plane functions such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159. AMF 152 communicates with UE 101 via an N1 control interface. AMF 152 can also attach to an access network control function 142 via an N2 interface. SMF 153 communicates with UPF 144 using an N4 interface. AMF 152, SMF 153, PCF 154, UDM 155, NRF 157, AUSF 156 and NSSF 159 are incorporated along with other network functions and services in core 105. Further details on services and functions provided by AMF 152, SMF 153, PCF 154, UDM 155, NRF 157, AUSF 156 and NSSF 159 can be found in 3rd Generation Partnership Project 2021, Technical Specification Group Services and System Aspects; System architecture for the 5G System (5GS); Stage 2 (Release 17), TS 23.501 V17.0.0 (2021-03), the entire contents of which is hereby incorporated by reference.

Example network system 100 includes access network intelligent controller (ANIC) 102. ANIC 102 implements techniques described herein to facilitate control of services provided by multiple types of access networks, and can facilitate such control over multiple types of access networks simultaneously. ANIC 102 provides a platform and operating environment to applications (e.g., applications 191A-191N, each of which may be generically referred to as an "application 191") that control and make use of functions and services and internal logic provided by core 105, access network control functions 142, and UEs 101. In some aspects, application 191 can be a third-party application, i.e., an application that is provided from a source that is different from the source of ANIC 102. In some aspects, applications 191A-191N may be implemented as docker containers, and ANIC 102 provides a platform for executing the applications in their respective containers. In some aspects, ANIC 102 may provide a plug-in interface, and applications 191A-191N may be plugins that can be added to ANIC 102 via the plug-in interface.

Figure 2:
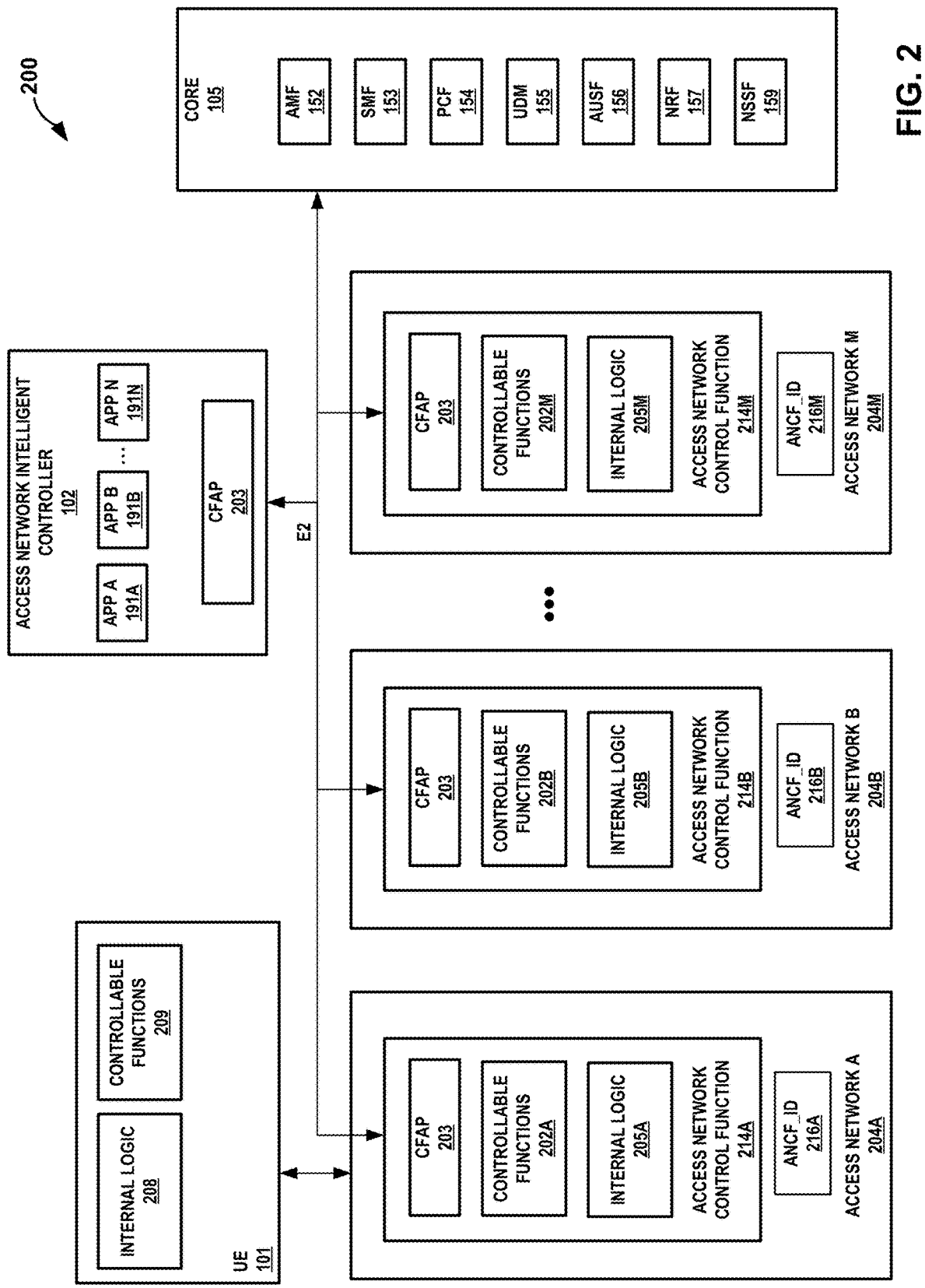
FIG. 2 is a block diagram illustrating further details of the example network system, according to techniques of the disclosure.

FIG. 2 is a block diagram illustrating further details of the example network system 100 of FIG. 1, according to techniques of the disclosure. The example illustrated in FIG. 2 shows multiple access networks 204A-204M (generically referred to as "access network 204"). Access networks 204A-204M can include wireless networks such as RANs of 3GPP networks, Wi-Fi or WiMAX or other trusted or non-trusted non-3GPP wireless network, and can include wired networks such as DSL, PON, and cable networks. Each of the access networks 204A-204M has a corresponding access network control function 214A-214N (each of which may be generically referred to as an "access network control function 214" and collectively as "access network control functions 214"). Access network control function 214 can be an example of access network control function 142 (FIG. 1). An access network control function 214 can be specialized for its corresponding access network 214. For example, in the case that access network 204 is a RAN, access network control function 214 can be gNodeB. In the case that access network 204 is an untrusted non-3GPP wireless network, access network control function 214 can be N3IWF. In the case that access network is a trusted non-3GPP access network, access network control function 214 may be TNGF or TWIF. In the case that access network 204 is a wired or fixed access network, access network control function 214 may be W-AGF.

Core functions of core 105 (e.g., AMF 152, SMF 153, PCF 154, UDM 155, AUSF 156, NRF 157, NSSF 159 and others) can expose one or more control services to other core functions and access network control functions 214A-214M. For example, AMF 152 may expose access mobility management services, SMF 153 may expose session management services, PCF 154 may expose policy control services, AUSF 156 may expose authentication services, etc. Such core services may be described by corresponding service models. A service model can be a data structure that includes information elements (IEs) that describe various aspects of the services provided by the respective access network control function and messages used to request and receive such services. An IE can have a name identifying the IE, a type indicating a data type for the IE (integer, string etc.), and the value of the IE.

Each of access network control functions 214A-214M can also expose services provided by the respective access network control function. The services exposed by access network control functions 214A-214M can be described in corresponding access network control function service models. As with the core service model, an access network service model can include IEs that describe various aspects of the service provided by the corresponding access network control function and the control messages used to request and receive such services.

Each of access network control functions 214A-214M can implement controllable functions 202A-202M (generically referred to as "controllable functions 224"). Controllable functions 202 can expose services and, like core 105 and access network control function 204, the services exposed by controllable functions 224 can be described by a service model. The available controllable functions 202 provided by access network control function 214 can vary according to the type and/or version of the access network control function. Examples of controllable functions 202 that may be provided by an access network control function 214 include:

Authentication, authorization, and identity management functions
Access management functions
Resource allocation and management functions
Mobility management functions
Security management functions
User plane functions
Control plane functions
QoS related functions
3GPP Core network interface related functions (S1, NG)
Slicing related functions Access network control function 214 may provide authentication, authorization and identity management controllable functions that provide for authentication, authorization, and identity management of network subscribers. As an example, application 191 may use such functions to provide a consistent subscriber authentication, authorization, and/or identity management across multiple access networks.

Access network control function 214 may provide access management and/or mobility management controllable functions that can be used by application 191 to monitor and control interactions of access network control function with AMF 152.

Access network control function 214 may provide security management controllable functions that can be used by application 191 to control and configure security services used by access network control function 214. For example, application 191 may configure security levels or security protocols to use. Further, application 191 may provide security services that may be otherwise unavailable to an access network control function 214.

Access network control function 214 may provide user plane controllable functions that can be used by application 191 to configure communication parameters and monitor data communication in a user plane provided, in part, by access network control function 214.

Access network control function 214 may provide control plane controllable functions that can be used by application 191 to configure communication parameters, insert control messages or other control plane signals, and monitor control plane messages and/or signaling in a control plane provided, in part, by access network control function 214.

Access network control function 214 may provide QoS related controllable functions that can be used by application 191 to set QoS parameters and to monitor QoS compliance for sessions and data flows handled by access network control function 214.

Access network control function 214 may provide slicing related controllable functions that can be used by application 191 to manage and control network slicing parameters. As an example, application 191 use slicing controllable functions to provide network slices across multiple access networks.

The above-described functions are examples of controllable functions that may be provided by access network control function 214. Other controllable functions may be provided in addition to those described above. For example, access network control function 214 may provide resource allocation and management controllable functions and controllable functions related to 3GPP Core network interface related functions (e.g., S1, NG).

In some aspects, an application 191 can subscribe to one or more of services provided by access network control function 214 and/or its corresponding controllable functions 202. In some aspects, controllable functions 202A-202M can include a report service, an insert service, a control service, and a policy service.

Each of access network control functions 214 may have a corresponding identifier that uniquely identifies an instance of the corresponding access network control function within a 5G network operated by an access network provider. This identifier may be referred to as an Access Network Control Function Identifier (ANCF_ID), illustrated in FIG. 2 as ANCF_IDs 216A-216M (collectively, "ANCF_IDs 216"). ANCF_IDs 216 may be composed of two identifiers, a network identifier that uniquely identifies a network provided by an access network provider, sometimes referred to as a Public Land Mobile Network (PLMN) identifier, and an identifier that uniquely identifies the access network control function 214 within the network identified by the PLMN identifier. As an example, ANCF_IDs 216 may be an identifier specified in section 9.3.1.5 of 3rd Generation Partnership Project 2021, Technical Specification Group Radio Access Network; NG-RAN; NG Application Protocol (NGAP) (Release 16), 3GPP TS 38.413 V16.4.0 (2021-01), the entire contents of which are hereby incorporated by reference. Thus, in such examples, ANCF_ID may be gNB ID for a gNodeB access network control function, NB ID for an eNodeB access network control function, N3IWF ID for an N3IWF access network control function, TNGF ID for a TNGF access network control function, TWIF ID for a TWIF access network control function, or W-AGF ID for a W-AGF access network control function.

In some aspects, an application 191 can subscribe to a report service of a controllable function. The subscription request may specify an event trigger or other conditions. Controllable function 202 may provide the subscribing application 191 with a subscription identifier (ID) for the subscription. When the controllable function 202 detects the occurrence of the event trigger or a match to the conditions in the access network control function 204, controllable function 202 sends a message (e.g., a report message) to the subscribing application 191 to notify the application that the trigger event has occurred or that conditions in the access network control function 214 match those specified in the subscription request. The message may include the subscription ID.

In some aspects, an application 191 can subscribe to an insert service of a controllable function 202. The subscription request may specify an event trigger or other conditions. Controllable function 202 may provide the subscribing application 191 with a subscription identifier (ID) for the subscription. When the controllable function 202 detects the occurrence of the event trigger or a match to the specified conditions in the access network control function 204, the controllable function can send a message (e.g., an insert message) to the subscribing application 191 to notify the application that the trigger event has occurred or that conditions in the access network control function 214 match those specified in the subscription request. The message may include the subscription ID. In some aspects, the controllable function suspends operation of a procedure in the access network control function that triggered the event or for which the conditions matched those specified in the subscription request. The subscribing application 191 may provide a control message to the controllable function while the procedure in access network control function 214 is suspended. Controllable function 214 can resume the procedure using information from the control message.

In some aspects, an application 191 can subscribe to a control service of a controllable function 202. Controllable function 202 may provide the subscribing application 191 with a subscription identifier (ID) for the subscription. The subscribing application 191 may provide a control message to the controllable function 202 to initiate a new procedure within access network control function 214 or resume a previously suspended procedure within access network control function 214.

In some aspects, an application 191 can subscribe to a policy service of a controllable function 202. The subscription request may specify an event trigger or other conditions and may include policy data defining a policy to be implemented by the access network control function. Controllable function 202 may provide the subscribing application 191 with a subscription identifier (ID) for the subscription. When the controllable function 202 detects the occurrence of the event trigger or a match to the specified conditions in the access network control function 204, the controllable function modify the operation of a procedure generating the event according to the policy.

Examples of message sequences for the above-described service are described below with respect to FIGS. 5A-5C, 6, 7 and 8.

Applications 191A-191N can exchange messages with controllable functions 202A-202M of access network control functions 214A-214M via a controllable function application protocol 203. In some aspects, applications 191A-191N can exchange messages with access network control functions 214A-214M via an E2 interface between access network intelligent controller 102 and access network control functions 214. Controllable function application protocol (CFAP) 203 may define message types, message formats and information elements included in messages exchanged between an application 191 and controllable functions 202. Controllable function application protocol 203 may be implemented using a standard protocol such as HyperText Transfer Protocol (HTTP). In such implementations, the HTTP payload can include subscription message commands and data, and control message commands and data.

In addition to interfacing with controllable functions 202, in some aspects, an application 191 can interface with internal logic 205A-205M (referred to generically as internal logic 205) of access network control functions 214A-214M. An access network control function 214 can expose interfaces to the internal logic 205 of the access network control function 214. An application 191 can use such interfaces to interact with and exchange data with the internal logic 205 of an access network control function.

Further, an application 191 can interface with the internal logic 208 of UE 101. In some aspects, an application 191 may not be able to interface directly with the internal logic 208 of UE 101 or, if present, controllable functions 209 of UE 101. In such cases, commands and data exchanged between application 191 and internal logic 208 of UE 101 may be relayed via the access network control function 214 communicatively coupled to UE 101.

Figure 3:
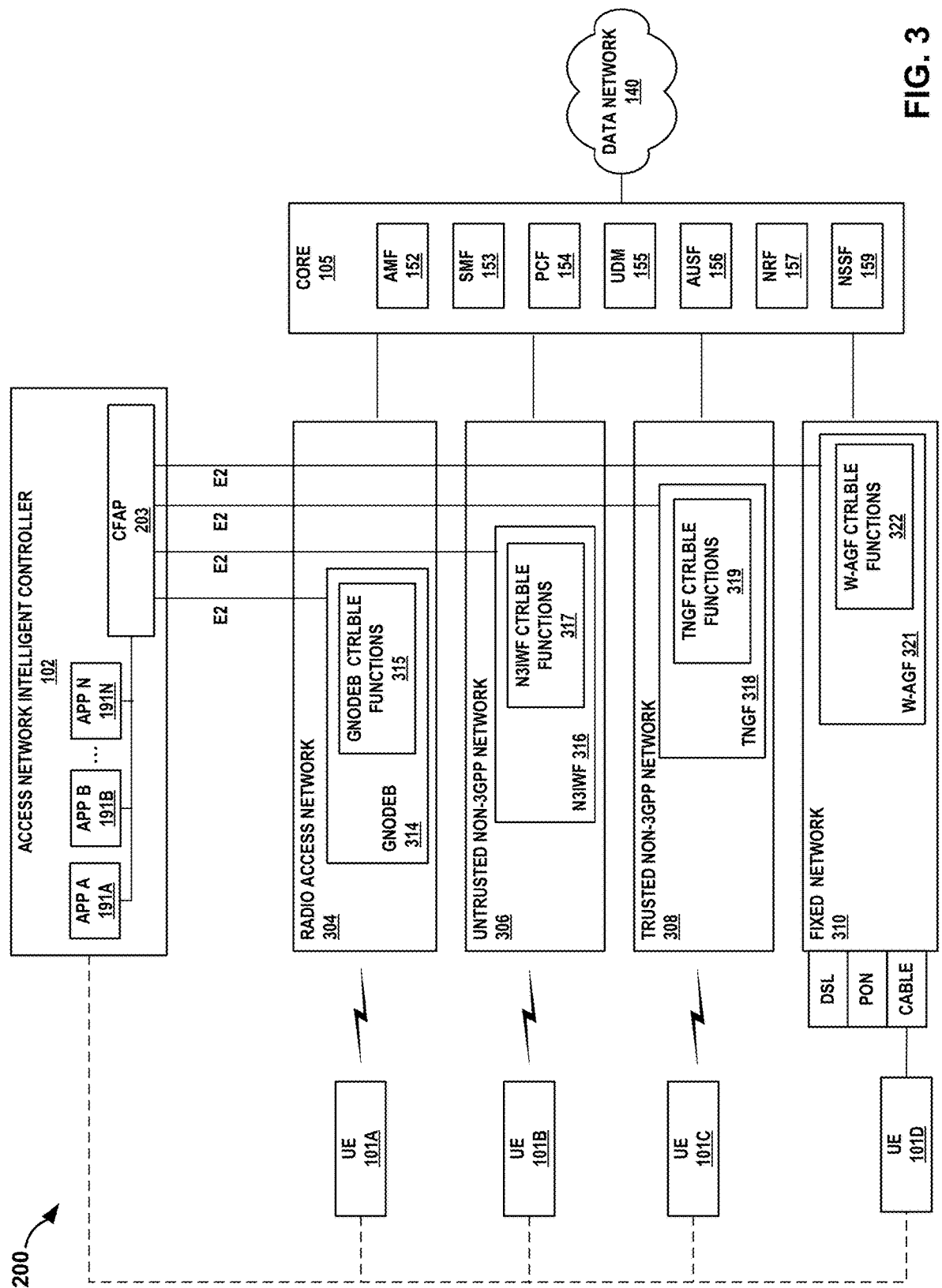
FIG. 3 is a block diagram illustrating an access network intelligent controller for controlling different types of access networks and controllable functions of access networks, according to techniques of the disclosure.

FIG. 3 is a block diagram illustrating an access network intelligent controller for controlling different types of access networks, access network control functions, and controllable functions of access network control functions, according to techniques of the disclosure. In the example illustrated in FIG. 3, access networks include radio access network (RAN) 304, untrusted non-3GPP network 306, trusted non-3GPP network 308, and fixed network 310. Each of these access networks has its own specialized access network control function, gNodeB 314, N3IWF 316, TNGF 318 and W-AGF 311 respectively, that correspond to access network control function 142 of FIG. 1 and access network control functions 214A-214M of FIG. 2. Additionally, each access network control function gNodeB 314, N3IWF 316, TNGF 318 and W-AGF 311 has corresponding gNodeB controllable functions 315, N3IWF controllable functions 317, TNGF controllable functions 319, and W-AGF controllable functions 322, respectively.

Access network control functions gNodeB 314, N3IWF 316, TNGF 318 and W-AGF 311 may at a high level, provide or consume the same or similar services. For example, each of gNodeB 314, N3IWF 316, TNGF 318 and W-AGF 311 may utilize authentication services. However, some of the access network control functions may utilize different authentication mechanisms than others of the access network control functions. Thus, while gNodeB 314, N3IWF 316, TNGF 318 and W-AGF 311 may all utilize authentication services, they may do so in different ways. Similarly, gNodeB 314, N3IWF 316, TNGF 318 and W-AGF 311 may all utilize session management services, slicing services, policy services, etc., but may do so in different ways. The information elements in the service models associated with the respective access network control functions can reflect these differences. An application 191 can use the service model of an access network control function to determine the services provided and consumed by the access network control function.

An application 191 can use controllable function application protocol 203 to interface with services across disparate access networks regardless of service implementation differences across the access networks. Such services can include authentication services, slicing services, mobility management services, and resource management services.

As an example, an operator of multiple types of access networks can configure application 191 to provide common control of authentication services across disparate access networks. As an example, an application 191 may be an authentication application that can subscribe to receive a report of when authentication events occur within each of the different access networks managed by the network operator. The authentication application can utilize an insert service and control service provided by controllable functions of each of the access network control functions to perform or control authentication operations. The authentication application can provide for common authentication across the different access network types, thereby providing an improved user experience to the users of the different access networks. For example, the user may be able to use a single set of authentication policies across the different access networks managed by the network operator instead of having to manage multiple sets of authentication policies, one for each access network.

As an additional example, an operator of multiple types of access networks can configure an application 191 as a Software Define Networking (SDN) controller. SDN platforms typically facilitate a configuration of overlay and underlay networks. The underlay network is made up of physical devices and connections over which the overlay network provides network virtualization. In some aspects, the SDN controller application can configure nodes reachable by multiple types of access networks as nodes of an underlay network.

As another example, an operator of multiple types of access networks can configure an application 191 as a slicing optimization application that implements network slicing optimization across multiple disparate access networks. Current systems are typically limited to implementing control on slicing on a single access network. Using the techniques disclosed herein, a slicing optimization application can subscribe to, and intervene in, slicing control messages exchanged between an access network control function and a slicing control function of a core network (e.g., NSSF 159). The slicing optimization application can configure network slices across the different types of access networks, thereby providing more control and better service to the network operator with respect to network slicing.

As a further example, an operator of multiple types of access networks can configure an application 191 as an access and mobility management application that controls user equipment access and handoff on the disparate networks. For example, an end-user working at home may connect a laptop to a work network via a home wireless access point that connects to a wired access network, perhaps through a residential gateway. The user may then decide to go to the office via public transportation. While on the public transportation, the user may connect the laptop to the work network via a 3GPP mobile network. Finally, upon arriving to the office, the user may connect to the work network via a trusted non-3GPP network. The access and mobility management application may handle connection and session management handoffs as the user changes between the different types of access networks.

As a still further example, an operator of multiple types of access networks can configure an application 191 as a resource management application to monitor resource usage across the different types of access networks. The resource management application can allocate processing resources across the different types of access networks depending on how the control messages indicate the access networks are being used. For example, a resource management application can subscribe to receive duplicates of connection control messages, session management control messages etc. to determine usage of the different access networks managed by the operator. Processing resources can be shifted from one access network to another access network as the number of connections or number of sessions on an access network increases or decreases.

The example shown in FIG. 3 includes four instances of example access network control functions, gNodeB 314, N3IWF 316, TNGF 318 and W-AGF 311. There can be more than one instance of each type of access network control function in network system 200. Further, there may be other types of access network control functions 214 instead of, or in addition to, gNodeB 314, N3IWF 316, TNGF 318 and W-AGF 311. For example, there may be a TWIF access network control function that can include controllable functions that can be accessed and used by applications 191 of ANIC 102.

Figure 4:
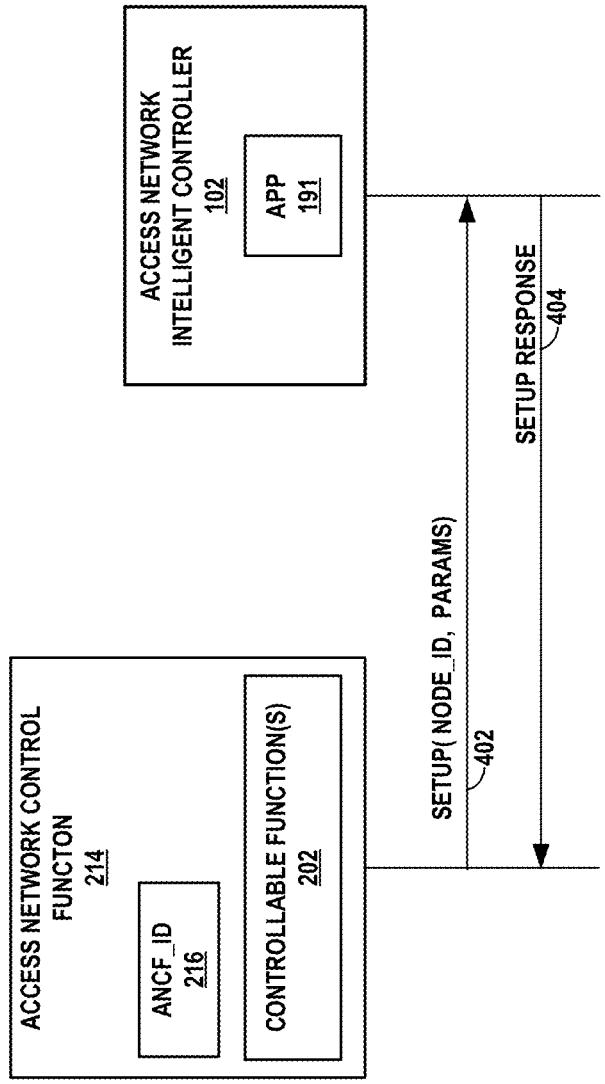
FIG. 4 is a sequence diagram illustrating an example sequence of messages for an access network control function to establish a connection with an access network intelligent controller, according to techniques of the disclosure.

FIG. 4 is a sequence diagram illustrating an example sequence of messages for an access network control function to establish a connection with an access network intelligent controller, according to techniques of the disclosure. In some aspects, access network control function 214 initiates setup of a connection with ANIC 102 by sending a setup message to ANIC 102. In some aspects, access network control function 214 sends a setup message that requests a connection using an E2 interface (402). The setup message can include a node identifier that identifies the access network control function. As an example, for an E2 interface, the setup message may comply with an "E2 SETUP REQUEST" message as defined in O-RAN Alliance e. V, "O-RAN Working Group 3, Near-Real-time RAN Intelligent Controller, E2 Application Protocol (E2AP), O-RAN.WG3.E2AP-v02.00 Technical Specification (2020), the entire contents of which is hereby incorporated by reference. In this case, the node identifier may be a Global RAN Node ID that is extended to include identifiers for non-3GPP access network control functions as defined in Technical Specification Group Radio Access Network; NG-RAN; NG Application Protocol (NGAP) (Release 16), which has been previously incorporated by reference. For example, the Global RAN Node ID may be extended to include one of ANCF_IDs 216.

The setup message may also include parameters, such as a list of the controllable functions 202 supported by access network control function 214.

ANIC 102 can receive the setup message and can process the message. ANIC 102 can send a response that indicates whether ANIC 102 successfully processed the message to establish the connection between access network control function 214 and ANIC 102. If the connection is successfully established, application 191 may use the established connection to communicate with access network control function 214 and its controllable functions 202. Application 191 can include the corresponding one of ANCF_IDs 216 to indicate which of access network control functions 214 is to receive messages sent by application 191.

Figure 5A:
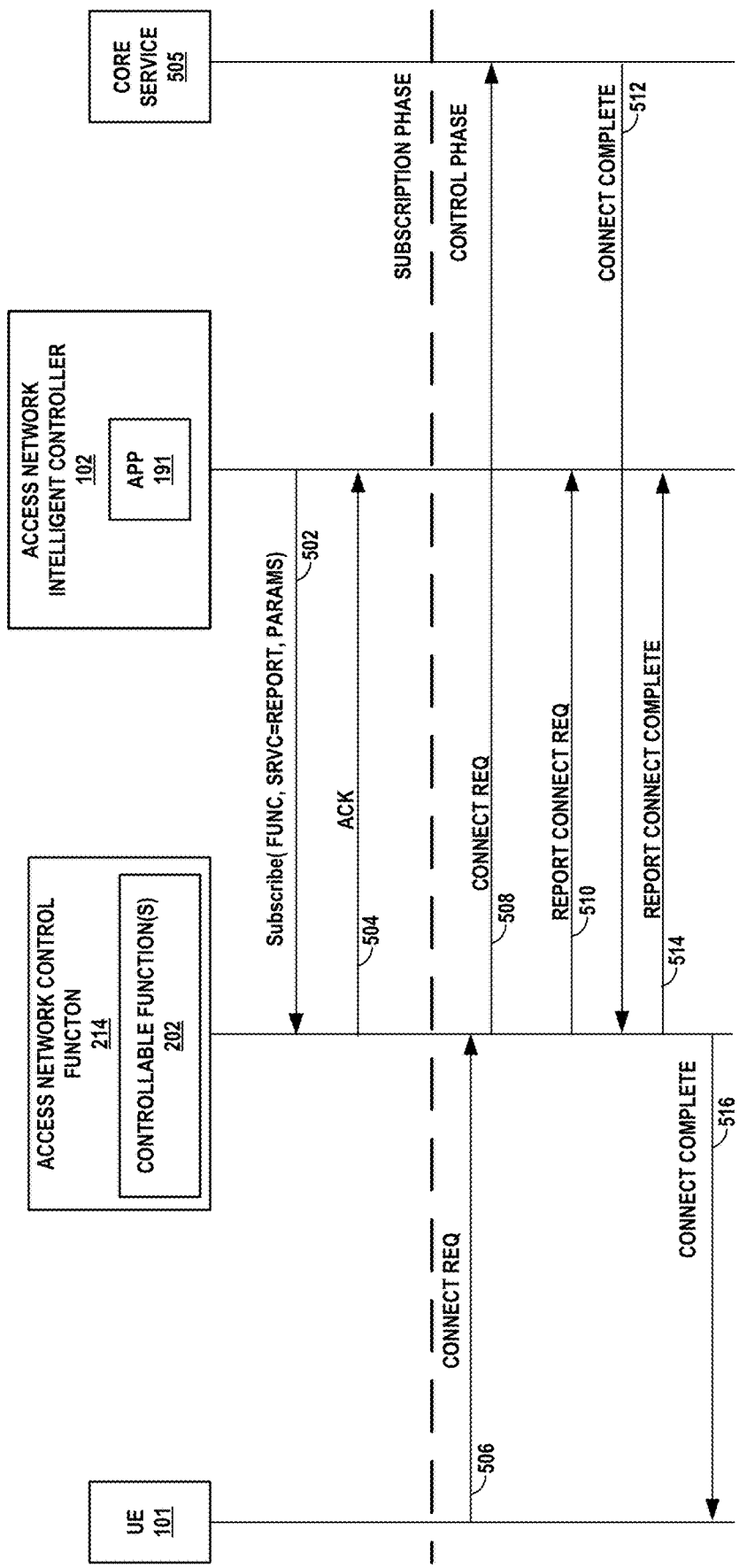
FIGS. 5A-5C are sequence diagrams illustrating example sequences of messages for different use cases of an application of an access network intelligent controller interfacing with a report service provided by a controllable function, according to techniques of the disclosure.
Figure 5B:
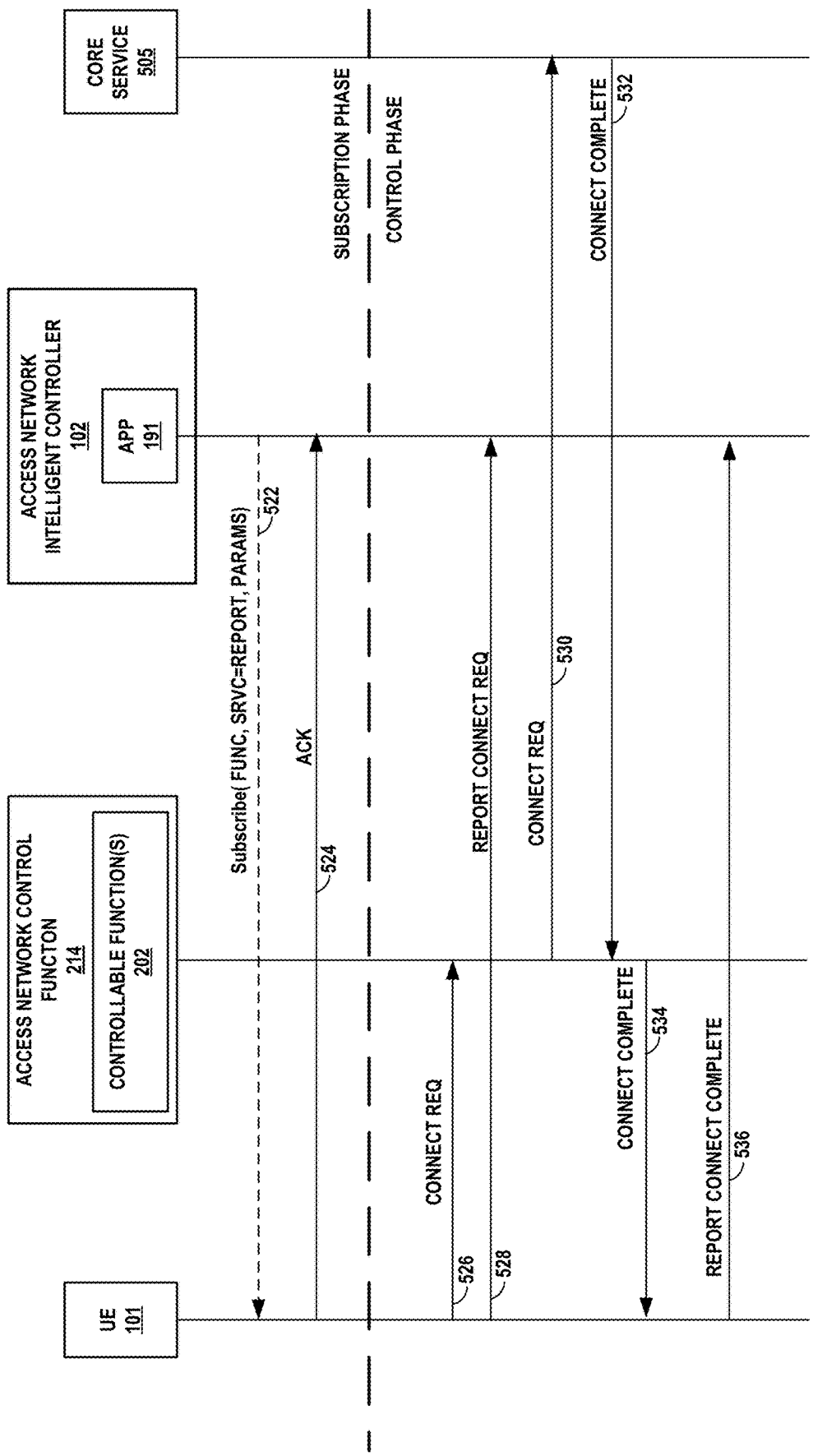
Figure 5C:
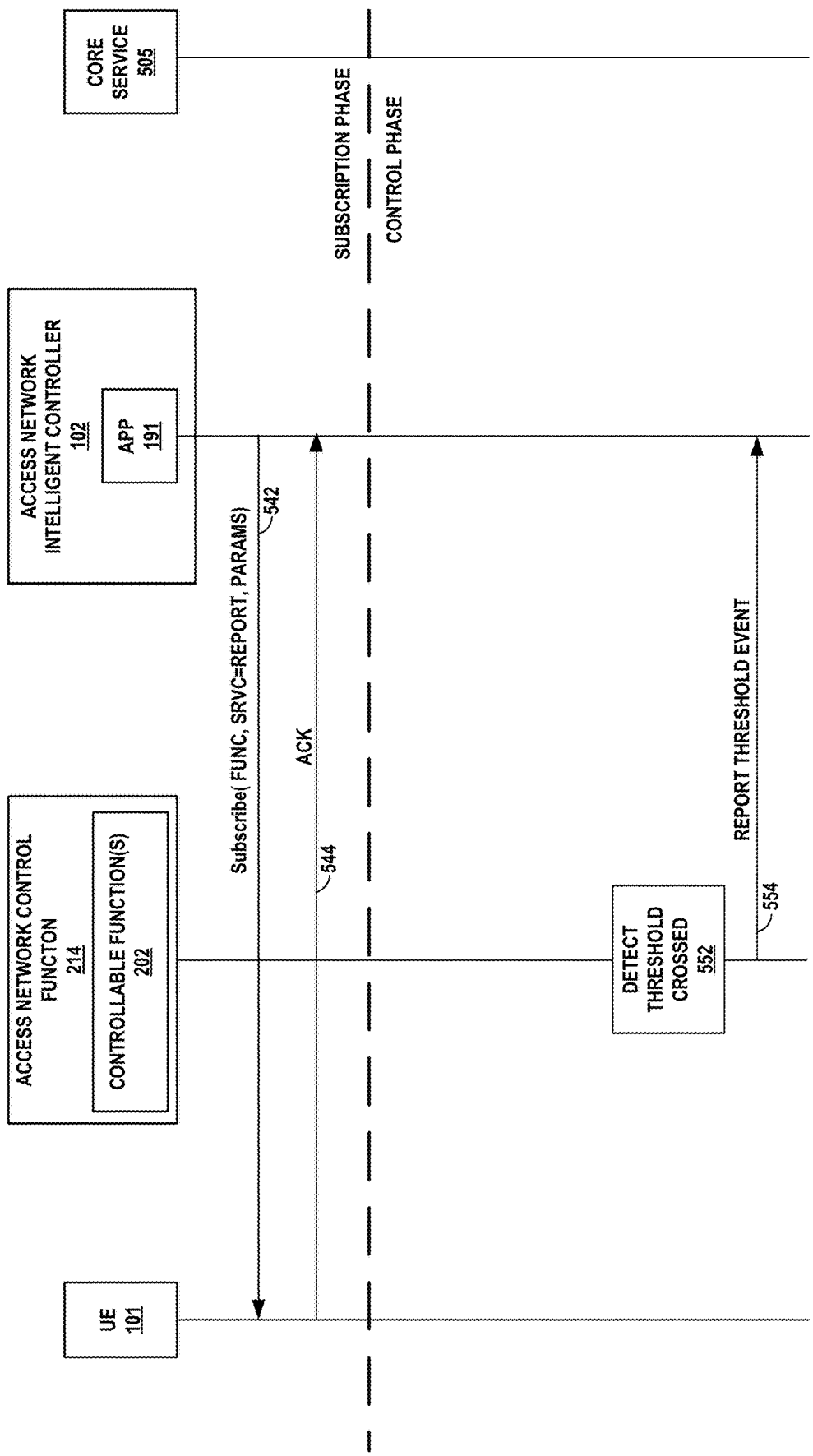

FIGS. 5A-5C are sequence diagrams illustrating example sequences of messages for different use cases of an application 191 of an access network intelligent controller interfacing with a report service provided by a controllable function 202, according to techniques of the disclosure. In the examples shown in FIGS. 5A-5C, reference is made to core service 505. Core service 505 can be any of AMF 152, SMF 153, PCF 154, UDM 155, NRF 157, AUSF 156 and NSSF 159 of FIG. 1, or other service, function, or internal logic of core 105.

FIG. 5A is a sequence diagram illustrating an example message sequence during a subscription to a report service provided by controllable function. FIG. 5A illustrates a use case where an application 191 is notified of connection requests received by access network control function 214. In the example illustrated in FIG. 5A, application 191 issues a subscription request message to controllable function 202 to subscribe to a report service provided by controllable function 202 (502). In the example use case illustrated in FIG. 5A, the subscription request message specifies that controllable function 202 is to provide a report when a connection request event is detected, e.g., when access network control function 214 receives a connection request from UE 101. The message payload can include an identification of the access network control function for which connection requests are to be reported, an indication that the subscription request is for the report service, and parameters that specify that connection request events are to be reported. In some aspects, the message payload can also include parameters that further define the events of interest to application 191. For example, the parameters may identify particular types of user equipment, or particular user equipment devices etc. Controllable function 202 can reply to the subscription request with an acknowledgement (504). The subscription and acknowledgement messages can be considered a subscription phase of interaction between application 191 and controllable function 202. Following a successful subscription, application 191 can enter a reporting phase where connection request events detected by controllable function 202 are reported to application 191.

During the reporting phase of operation of application 191, UE 101 issues a connection request to access network control function 214 (506). The connection request is processed by access network control function, which can include sending connection request message to core service 505 (508). Additionally, controllable function 202 detects that connection request event and determines that the connection request matches conditions specified in the subscription request (if any). Controllable function 202 reports the connection request to application 191 (510).

Core service 505 can issue a "connection complete" message to access network control function 214 in response to the connection request message (512). Controllable function 202 can detect the connection complete event, and can report the connection complete event to application 191 (514). In addition, access network control function 214 can issue a connection complete message to UE 101 (516).

FIG. 5B is a sequence diagram illustrating another example message sequence during a subscription to a report service provided by controllable function. FIG. 5B illustrates a use case where an application 191 is notified of connection requests received by access network control function 214 issued by UE 101. In the example illustrated in FIG. 5B, application 191 issues a subscription request message to UE 101 to subscribe to connection events (522). In some aspects, application 191 does not have direct access to UE 101 and requests may be relayed via controllable function 202. A dashed line is used in FIG. 5B to indicate a logical connection between application 191 and UE 101 in cases where controllable function 202 acts as a relay for messages between application 191 and UE 101. In the example use case illustrated in FIG. 5B, the subscription request message specifies that UE 101 is to provide a report when a connection request event is detected, e.g., when UE 101 issues a connection request to access network control function 214. UE 101 can reply to the subscription request with an acknowledgement (524). The subscription and acknowledgement messages can be considered a subscription phase of interaction between application 191 and UE 101. Following a successful subscription, application 191 can enter a reporting phase where connection request events detected by UE 101 are reported to application 191.

During the reporting phase of operation of application 191, UE 101 issues a connection request to access network control function 214 (526). Additionally, UE 101 reports the connection request to application 191 (528). The connection request is processed by access network control function 214, which can include sending the connection request message to core service 505 (530).

Core service 505 can issue a "connection complete" message to access network control function 214 in response to the connection request message (532). In addition, access network control function 214 can issue a connection complete message to UE 101 (534). UE 101 can report the connection complete event to application 191 (536).

FIG. 5C is a sequence diagram illustrating an example message sequence during a subscription to a report service provided by controllable function. FIG. 5A illustrates a use case where an application 191 is notified when a threshold event is detected by controllable function 202. In the example illustrated in FIG. 5C, application 191 issues a subscription request message to controllable function 202 to subscribe to a report service provided by controllable function 202 (542). In the example use case illustrated in FIG. 5C, the subscription request message specifies that controllable function 202 is to provide a report when threshold is crossed. As an example, application 191 may want to be notified if access network control function 214 is using 90% of available resources. The message payload can include an identification of the access network control function for which connection requests are to be reported, an indication that the subscription request is for the report service, and parameters that specify resource usage threshold. Controllable function 202 can reply to the subscription request with an acknowledgement (544). The subscription and acknowledgement messages can be considered a subscription phase of interaction between application 191 and controllable function 202. Following a successful subscription, application 191 can enter a reporting phase where resource usage threshold crossing events detected by controllable function 202 are reported to application 191.

During the reporting phase of operation of application 191, controllable function 202 detects that the resource usage of access network control function 214 has crossed the threshold specified in the subscription request (552). Controllable function 202 reports the threshold crossing event to application 191 (554).

Figure 6:
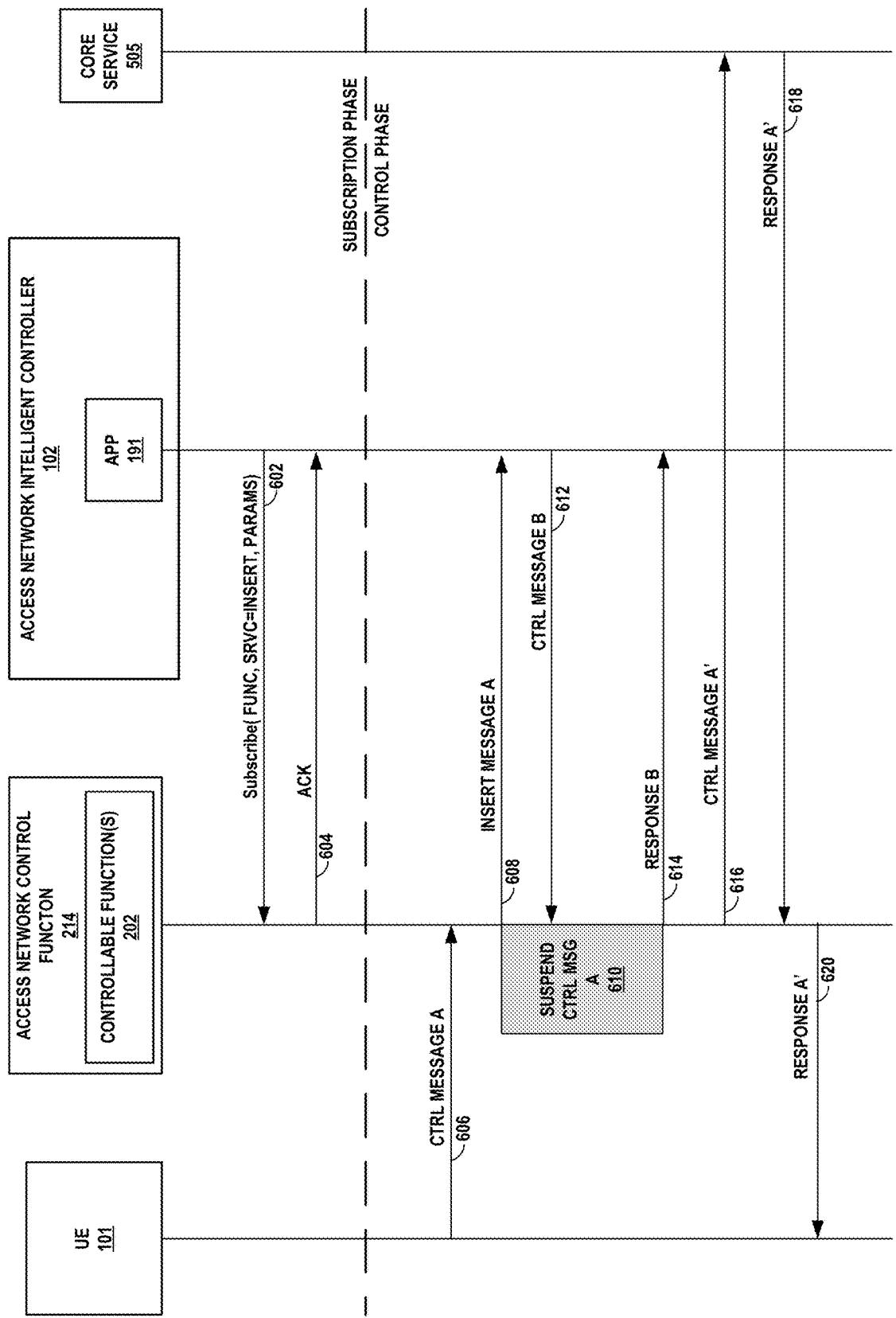
FIG. 6 is a sequence diagram illustrating an example sequence of messages for interacting with an insert service of an access network control function, according to techniques of the disclosure.

FIG. 6 is a sequence diagram illustrating an example sequence of messages for interacting with an insert service of an access network control function, according to techniques of the disclosure. FIG. 6 is a sequence diagram illustrating an example message sequence during a subscription to an insert service provided by controllable function 202. FIG. 6 illustrates a use case where an application 191 is notified of certain control messages received by access network control function 214 from UE 101. In the example illustrated in FIG. 6, application 191 issues a subscription request message to controllable function 202 to subscribe to an insert service provided by controllable function 202 (602). In the example use case illustrated in FIG. 6, the subscription request message specifies that controllable function 202 is to notify application 191 when an event comprising a control message meeting criteria specified in the subscription request is detected. The message payload can include an identification of the access network control function for which the specified control messages are to be detected, an indication that the subscription request is for the insert service, and parameters that specify the events that are to be detected. In some aspects, the message payload can also include parameters that further define the events of interest to application 191. For example, the parameters may identify particular types of user equipment, or particular user equipment devices etc. Controllable function 202 can reply to the subscription request with an acknowledgement (604). The subscription and acknowledgement messages can be considered a subscription phase of interaction between application 191 and controllable function 202. Following a successful subscription, application 191 can enter a control phase where controllable function 202 notifies application 191 when controllable function 202 detects an event comprising a control message that meets the criteria specified in the subscription request.

In the example illustrated in FIG. 6, UE 101 generates a control message A intended for core 105 and sends control message A to access network control function 214 (606). Controllable function 202 can determine that control message A meets the subscription criteria specified in the subscription message (e.g., message 602). Controllable function 202 can send insert message A to application 191 to indicate that control message A has been detected (608). Additionally, in response to detecting that control message A meets the criteria specified in the subscription request, controllable function 202 can cause access network control function 214 to suspend processing associated with control message A (610).

In response to receiving insert message A, application 191 can generate control message B and send control message B to controllable function 202 (612). Control message B may specify actions that controllable function is to take while processing of control message A is suspended. For example, control message B may specify that controllable function 202 is to modify data or commands contained in control message A. As another example, control message B may specify that controllable function 202 is to initiate new processes, or cause access network control function 214 to initiate new processes. Controllable function 202 may optionally provide a response message B indicating to application 191 that processing of control message B is completed (614). Following receipt and processing of control message B, controllable function 202 may cause processing of control message A to resume. For the purposes of describing the example illustrated in FIG. 6, assume that control message B modifies data of control message A. Access network control function sends modified control message A' to core 105.

Figure 7:
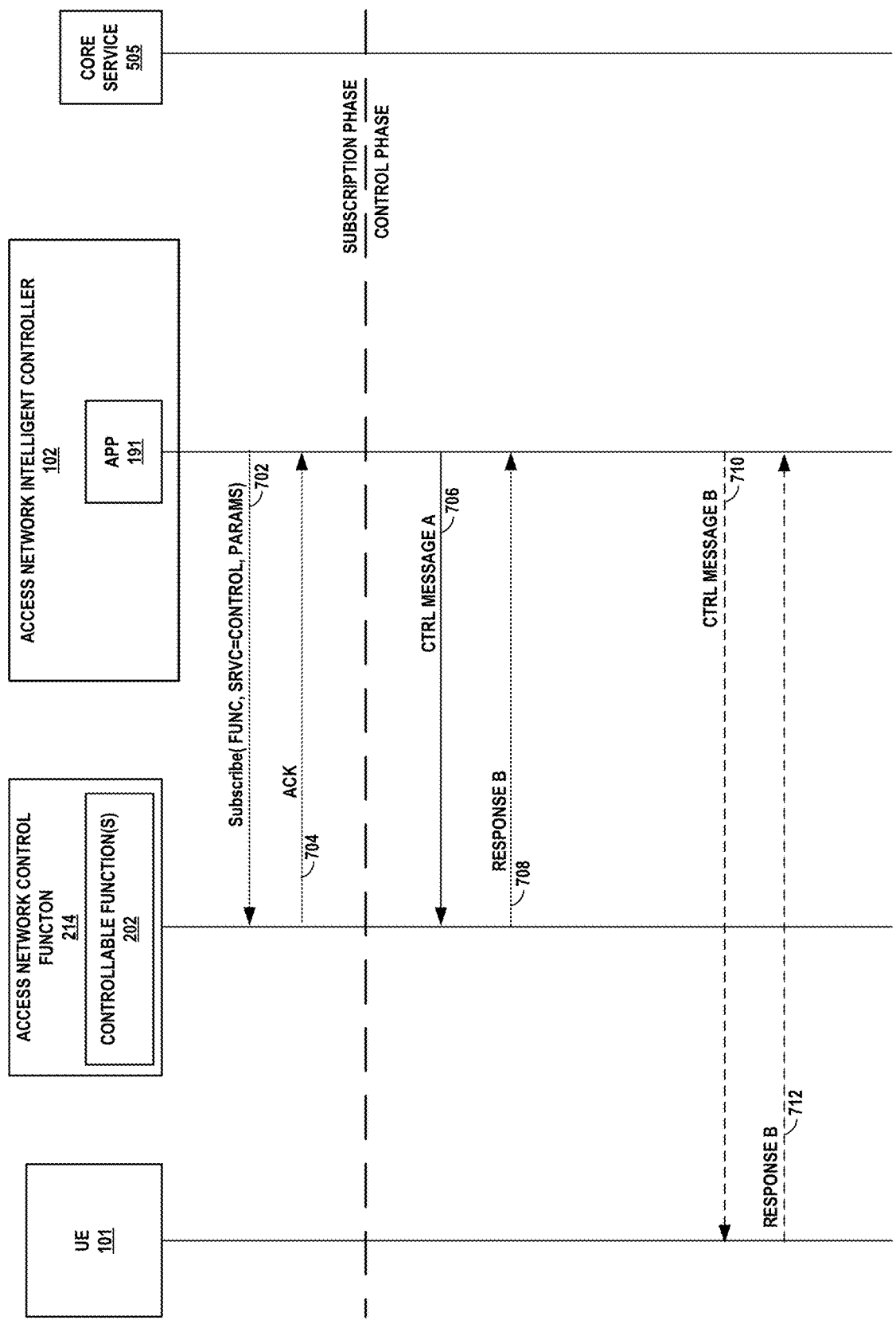
FIG. 7 is a sequence diagram illustrating an example sequence of messages for interacting with a control service of an access network control function, according to techniques of the disclosure.

FIG. 7 is a sequence diagram illustrating an example sequence of messages for interacting with a control service of an access network control function, according to techniques of the disclosure. FIG. 7 illustrates a use case where an application 191 controls certain processes within access network control function 214. In the example illustrated in FIG. 7, application 191 issues a subscription request message to controllable function 202 to subscribe to a control service provided by controllable function 202 (702). In the example use case illustrated in FIG. 7, the subscription request message specifies the access network control function to be controlled and that the subscription is for the control service. Controllable function 202 can reply to the subscription request with an acknowledgement (704). The subscription and acknowledgement messages can be considered a subscription phase of interaction between application 191 and controllable function 202. Following a successful subscription, application 191 can enter a control phase. In some aspects, the subscription phase is optional, and subscription request messages 702 and acknowledgement message 704 are not issued.

During the control phase, application 191 may send a control message A to controllable function 202 (706). The control message may be the same or substantially similar to the control message described above with respect to the insert service. That is, control message A may modify data of access network control function 214 or may initiate new processes to be performed by controllable function 202 or access network control function 214. Controllable function 202 may optionally issue a response message A indicating that control message A has been received and processed (708).

In some aspects, application 191 may send a control message B to UE 101 (710). In some aspects application 191 may not be directly connected to UE 101, and control message B may be relayed to UE 101 via controllable function 202. UE 101 may optionally provide a response message B to application 191 indicating that control message B has been processed (712). Again, the response message B may be relayed via controllable function 202.

Figure 8:
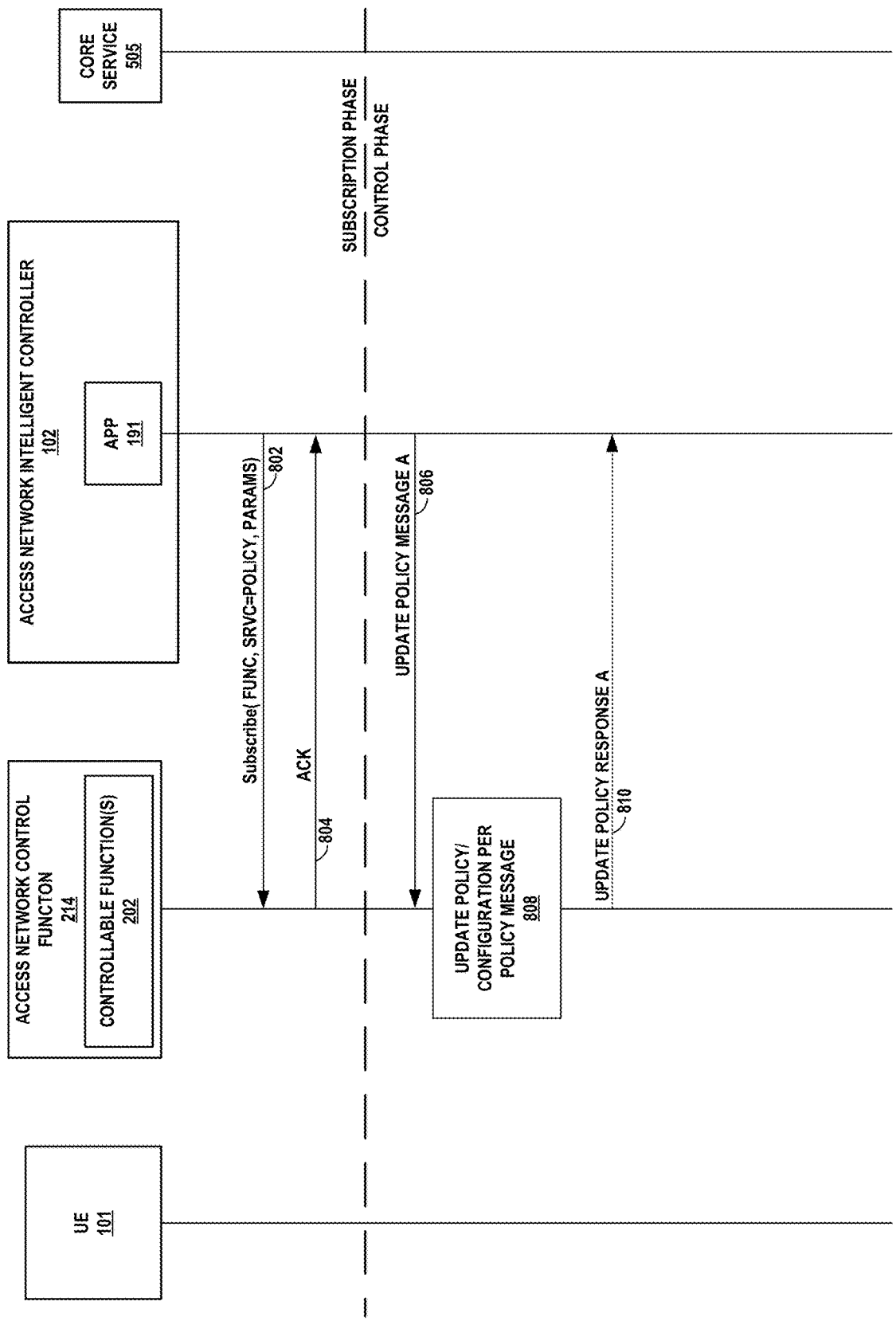
FIG. 8 is a sequence diagram illustrating an example sequence of messages for interacting with a policy service of an access network control function, according to techniques of the disclosure.

FIG. 8 is a sequence diagram illustrating an example sequence of messages for interacting with a policy service of an access network control function, according to techniques of the disclosure. FIG. 8 illustrates a use case where an application 191 updates policies or configurations affecting the operation of access network control function 214. In the example illustrated in FIG. 8, application 191 issues a subscription request message to controllable function 202 to subscribe to a policy service provided by controllable function 202 (802). In the example use case illustrated in FIG. 8, the message payload can include an identification of the access network control function for which policy updates are to be provided, and an indication that the subscription request is for the policy service. Controllable function 202 can reply to the subscription request with an acknowledgement (804). The subscription and acknowledgement messages can be considered a subscription phase of interaction between application 191 and controllable function 202. Following a successful subscription, application 191 can enter a policy update phase.

During the policy update phase, application 191 can send an update policy message to controllable function 202. The payload of the policy update message may include an update for a previously existing policy for access network control function 214, or it may include a new policy. In response to receiving the update policy message, controllable function 202 may update the policy per the policy data provided in the update policy message (808). Controllable function 202 may optionally send a response message to application 191 indicating that the policy specified in the update policy message has been updated or created (810)

Figure 9:
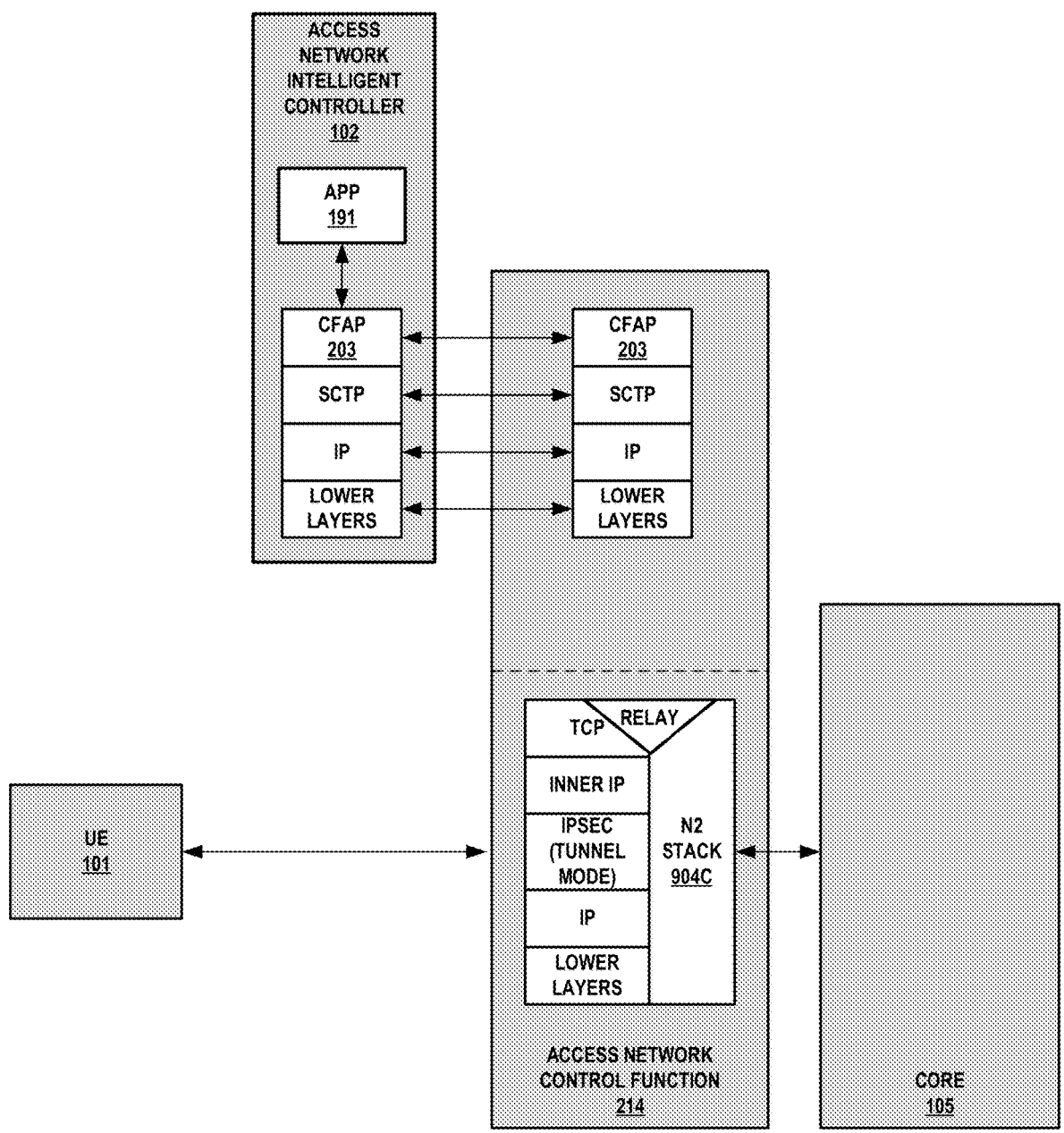
FIG. 9 is a conceptual view of various stacks of an access network intelligent controller and access network control functions, according to techniques of the disclosure.

FIG. 9 is a conceptual view of various stacks of an access network intelligent controller and access network control functions, according to techniques of the disclosure. The components of the network system 100 shown in FIGS. 1-3 can communicate with one another via various network stacks. In the example shown in FIG. 9, access network control function 214 communicates with core network 105 via an N2 network stack 904. The N2 stack 904 can include a physical layer L1, a media access layer L2, an Internet Protocol (IP) layer, a Stream Control Transmission Protocol (SCTP) layer, a Next Generation Application Protocol (NG-AP) layer, and a Non-Access Stratum (NAS) layer.

Access network control function may communicate with UE 101 via an access network stack 902. The access network stack thus includes a physical layer protocol of the access network at the lower layer of the network stack. Continuing up the network stack are an IP layer, IP Security (IPSEC) layer, Inner IP layer, and Transmission Control Protocol (TCP) layer. In some aspects, controllable function 202 can implement controllable function application protocol 203 on top of SCTP and IP layers. The lower layers can be a physical network layer communicably coupling controllable function 202 to access network intelligent controller 102 and its associated applications 191.

Figure 10:
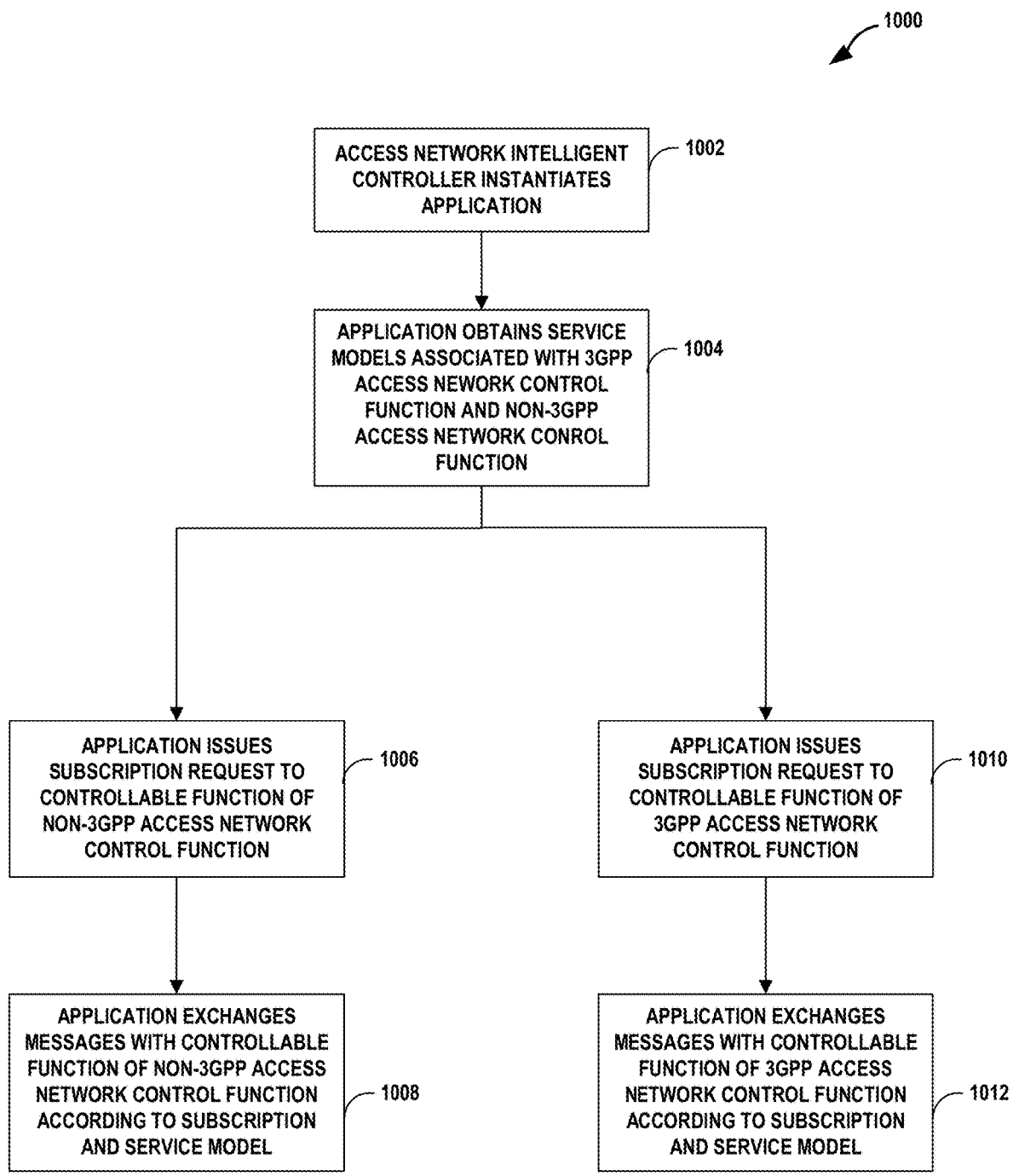
FIG. 10 is a flow diagram illustrating an example operation of an access network intelligent controller, according to techniques of the disclosure.

FIG. 10 is a flow diagram 1000 illustrating an example operation of an access network intelligent controller, according to techniques of the disclosure. As seen in the example of FIG. 10, ANIC 102 initially may instantiate an application (902). In some aspects, applications may be implemented as docker containers, and ANIC 102 provides a platform for executing applications in their respective containers. In some aspects, ANIC 102 may provide a plug-in interface, and applications may be plugins that can be added to ANIC 102 via the plug-in interface.

The instantiated application may obtain a service model for an access network control function (904). For example, the application may obtain the service model using a service model directory or a database of service models. The service model may describe the available controllable functions, services provided by the controllable functions, and message types and formats. In some aspects, the service model may describe interfaces for interacting with the internal logic of an access network control function.

The instantiated application can issue a subscription request to a controllable function of a non-3GPP access network control function (906). The subscription request may specify an event or events that trigger an action or procedure of the controllable function (e.g., a report action, an insert action, a control action, or a policy action). In addition, the subscription request may specify match conditions associated with the event. For example, the match conditions may specify a particular type of user equipment, a particular user ID, a particular time of day, day of week etc.

After subscribing to a service provided by a controllable function of a non-3GPP access network control function, the application and the controllable function can exchange messages according to the subscription (908). Examples of such message exchanges have been described above with respect to FIGS. 5A-5C, 6, 7 and 8.

The instantiated application can also issue a subscription request to a controllable function of a 3GPP access network control function (910). The subscription request may specify an event or events that trigger an action or procedure of the controllable function (e.g., a report action, an insert action, a control action, or a policy action). In addition, the subscription request may specify match conditions associated with the event. For example, the match conditions may specify a particular type of user equipment, a particular user ID, a particular time of day, day of week etc.

After subscribing to a service provided by a controllable function of a 3GPP access network control function, the application and the controllable function can exchange messages according to the subscription (912).

As shown in FIG. 10, the application may have a subscription to both a controllable function of a 3GPP access network control function and a non-3GPP access network control function concurrently. However, such concurrent operation is not a requirement, and serial subscriptions, overlapping subscriptions, and subscriptions to multiple controllable functions of an access network control function are possible.

Figure 11:
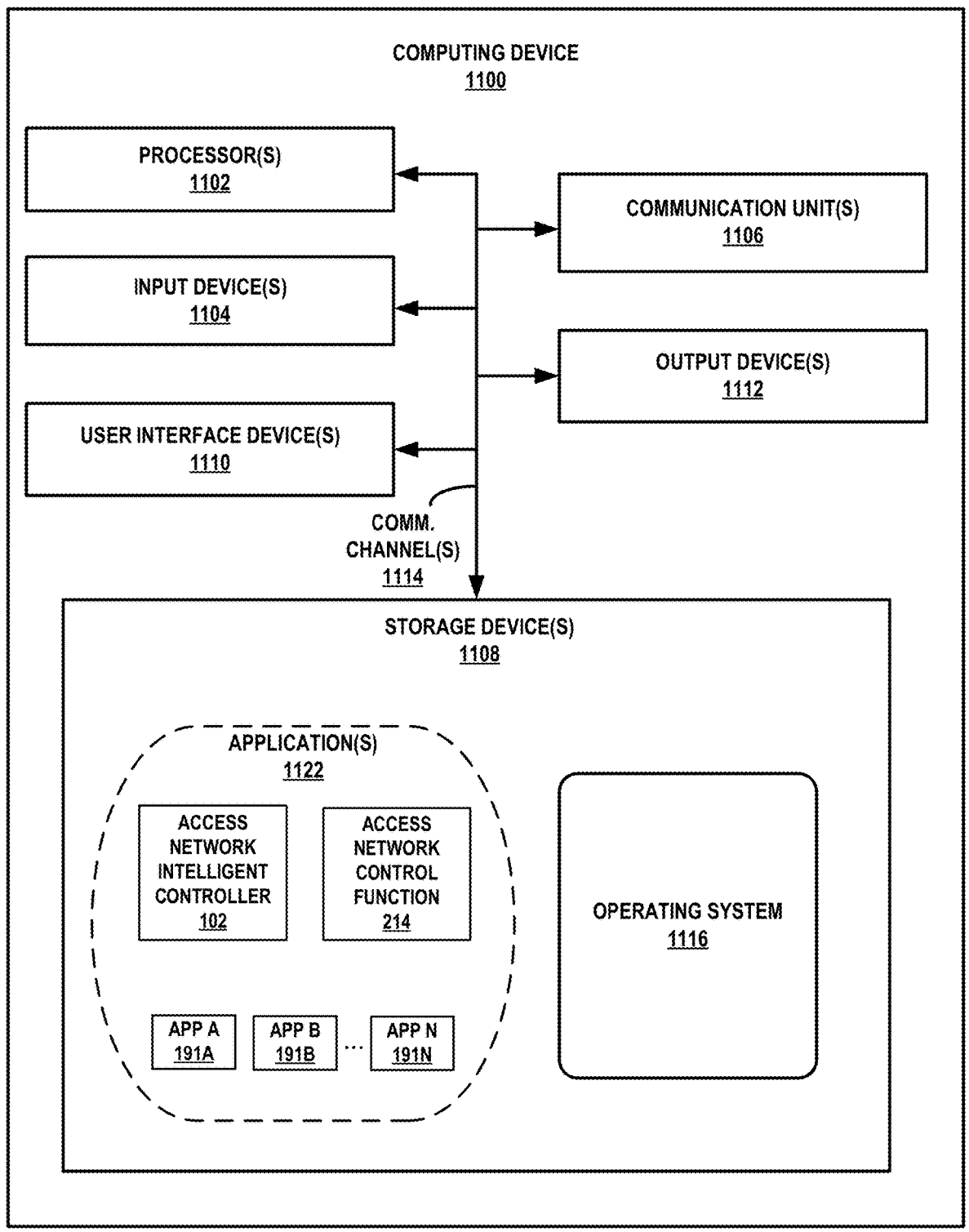
FIG. 11 is a block diagram illustrating further details of one example of a computing device that operates in accordance with one or more techniques of the present disclosure.

FIG. 11 is a block diagram illustrating further details of one example of a computing device that operates in accordance with one or more techniques of the present disclosure. FIG. 11 may illustrate a particular example of a server or other computing device 1100 that includes one or more processor(s) 1102 for executing any one or more of access network intelligent controller 102, access network agents 1124, applications 1122 or any other system, application, node software, or module described herein. Other examples of computing device 1100 may be used in other instances. Although shown in FIG. 11 as a stand-alone computing device 1100 for purposes of example, a computing device may be any component or system that includes one or more processors or other suitable computing environment for executing software instructions and, for example, need not necessarily include one or more elements shown in FIG. 11 (e.g., communication units 1106; and in some examples components such as storage device(s) 1108 may not be co-located or in the same chassis as other components). As shown in the specific example of FIG. 11, computing device 1100 includes one or more processors 1102, one or more input devices 1104, one or more communication units 1106, one or more output devices 1112, one or more storage devices 1108, and user interface (UI) device 1110. Computing device 1100, in one example, further includes one or more applications 1122 and operating system 1116 that are executable by computing device 1100. Each of components 1102, 1104, 1106, 1108, 1110, and 1112 are coupled (physically, communicatively, and/or operatively) for inter-component communications. In some examples, communication channels 1114 may include a system bus, a network connection, an inter-process communication data structure, a message bus, or any other method for communicating data. As one example, components 1102, 1104, 1106, 1108, 1110, and 1112 may be coupled by one or more communication channels 1114.

Processors 1102, in one example, are configured to implement functionality and/or process instructions for execution within computing device 1100. For example, processors 1102 may be processing circuitry capable of processing instructions stored in storage device 1108. Examples of processors 1102 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1108 may be configured to store information within computing device 1100 during operation. Storage device 1108, in some examples, is described as a computer-readable storage medium. In some examples, storage device 1108 is a temporary memory, meaning that a primary purpose of storage device 1108 is not long-term storage. Storage device 1108, in some examples, is described as a volatile memory, meaning that storage device 1108 does not maintain stored contents when the computer is turned off. Examples of volatile memories include random access memories (RAM), dynamic random access memories (DRAM), static random access memories (SRAM), and other forms of volatile memories known in the art. In some examples, storage device 1108 is used to store program instructions for execution by processors 1102. Storage device 1108, in one example, is used by software or applications running on computing device 1100 to temporarily store information during program execution.

Storage devices 1108, in some examples, also include one or more computer-readable storage media. Storage devices 1108 may be configured to store larger amounts of information than volatile memory. Storage devices 1108 may further be configured for long-term storage of information. In some examples, storage devices 1108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1100, in some examples, also includes one or more communication units 1106. Computing device 1100, in one example, utilizes communication units 1106 to communicate with external devices via one or more networks, such as one or more wired/wireless/mobile networks. Communication units 1106 may include a network interface card, such as an Ethernet card, an optical transceiver, a radio frequency transceiver, or any other type of device that can send and receive information. In some examples, computing device 1100 uses communication unit 1106 to communicate with an external device.

Computing device 1100, in one example, also includes one or more user interface devices 1110. User interface devices 1110, in some examples, are configured to receive input from a user through tactile, audio, or video feedback. Examples of user interface devices(s) 1110 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1112 may also be included in computing device 1100. Output device 1112, in some examples, is configured to provide output to a user using tactile, audio, or video stimuli. Output device 1112, in one example, includes a presence-sensitive display, a sound card, a video graphics adapter card, or any other type of device for converting a signal into an appropriate form understandable to humans or machines. Additional examples of output device 1112 include a speaker, a cathode ray tube (CRT) monitor, a liquid crystal display (LCD), or any other type of device that can generate intelligible output to a user.

Computing device 1100 may include operating system 1116. Operating system 1116, in some examples, controls the operation of components of computing device 1100. For example, operating system 1116, in one example, facilitates the communication of one or more applications 1122, access network intelligent controller 102 and/or access network agents 1124 with processors 1102, communication unit 1106, storage device 1108, input device 1104, user interface devices 1110, and output device 1112.

Application 1122 may also include program instructions and/or data that are executable by computing device 1100. Example applications 1122 executable by computing device 1100 may include application and/or other software to implement capabilities described above. For example, applications 1122 can include applications 191A-191N to implement services across different access network control functions 214. Applications 1122 can further include access network intelligent controller 102, that as described above, can provide an operating platform and environment for applications 191A-191N.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A system comprising:
an access network intelligent controller comprising processing circuitry configured to communicate with a 3GPP access network control function in a network system and a non-3GPP access network control function in the network system, wherein:
the non-3GPP access network control function comprises a first plurality of controllable functions;
the 3GPP access network control function comprises a second plurality of controllable functions; and
the access network intelligent controller is configured to execute one or more applications, each application of the one or more applications configured to:
issue a first subscription request for a subscription to a first controllable function of the first plurality of controllable functions of the non-3GPP access network control function;
issue a second subscription request for a subscription to a second controllable function of the second plurality of controllable functions of the 3GPP access network control function; and
exchange messages with the first controllable function in accordance with the subscription to the first controllable function and with the second controllable function in accordance with the subscription to the second controllable function.

2. The system of claim 1, wherein the 3GPP access network control function comprises gNodeB and wherein the non-3GPP access network control function comprises one of Non-3GPP Interworking Function (N3IWF), a Trusted Wireless Local Area Network (WLAN) Interworking Function (TWIF), a Trusted Network Gateway Function (TNGF), or Wireline Access Gateway Function (W-AGF).

3. The system of claim 1, wherein the non-3GPP access network control function sends a connection setup request to establish a communication session with the access network intelligent controller, wherein the connection setup request includes an identifier for the non-3GPP access network control function that uniquely identifies the non-3GPP access network control function within the network system.

4. The system of claim 3, wherein the identifier comprises one of an N3IWF identifier (ID) for an N3IWF access network control function, a TNGF ID for a TNGF access network control function, a Trusted Wireless Local Area Network (WLAN) Interworking Function (TWIF) ID for a TWIF access network control function, or W-AGF ID for a W-AGF access network control function.

5. The system of claim 1, wherein the first plurality of controllable functions and the second plurality of controllable functions comprise one or more of a radio resource management function, an admission control function, a slicing function, a resource allocation function, a mobility management function, an authentication function, an authorization function, an identity management function, an access management function, a security management function, a user plane function, a control plane function, a Quality-of-Service (QOS) function, or a 3GPP core network interface function.

6. The system of claim 1, wherein the first controllable function comprises internal logic of the non-3GPP access network control function.

7. The system of claim 1, wherein the subscription to the first controllable function comprises a subscription to a service of the first controllable function.

8. The system of claim 7, wherein the service comprises a report service configured to:
detect a trigger event specified in the first subscription request; and
send a report message to the application in response to detecting the trigger event.

9. The system of claim 7, wherein the service comprises a control service configured to:
receive a control message from the application; and
initiate a new process specified in the control message.

10. A system comprising:
an access network intelligent controller comprising processing circuitry configured to communicate with a 3GPP access network control function in a network system and a non-3GPP access network control function in the network system, wherein:
the non-3GPP access network control function comprises a first plurality of controllable functions;
the 3GPP access network control function comprises a second plurality of controllable functions; and
the access network intelligent controller is configured to execute one or more applications, each application of the one or more applications configured to:
issue a subscription request for a subscription to an insert service of a first controllable function of the first plurality of controllable functions of the non-3GPP access network control function, and exchange messages with the first controllable function in accordance with the subscription, wherein the insert service is configured to:
- detect a trigger event specified in the subscription request;
- send an insert message to the application in response to detecting the trigger event;
- suspend execution of the controllable function;
- receive a control message from the application; and
- resume execution of the controllable function after processing the control message.

11. The system of claim 7, wherein the service comprises a policy service to:
- detect a trigger event specified in the first subscription request; and
- in response to detecting the trigger event, modify a procedure of the controllable function according to a policy specified in the first subscription request.

12. The system of claim 1, wherein the application is further configured to:
- issue a control message for a user equipment, wherein the control message is relayed to the user equipment via the first controllable function or the second controllable function.

13. The system of claim 1, wherein the second controllable function corresponds to the first controllable function.

14. The system of claim 1, wherein the first controllable function comprises a slicing function of the non-3GPP access network control function and the second controllable function comprises a slicing function of the 3GPP access network control function.

15. The system of claim 1, further comprising a 5th generation mobile network ("5G") core communicatively coupled to the 3GPP access network control function and the non-3GPP access network control function.

16. A method comprising:
- instantiating, by an access network intelligent controller comprising processing circuitry configured to communicate with a 3GPP access network control function and a non-3GPP access network control function, one or more applications;
- issuing, by an application of the one or more applications, a first subscription request for a subscription to a first controllable function of a first plurality of controllable functions of the non-3GPP access network control function;
- issuing, by the application, a second subscription request to a second controllable function of a second plurality of controllable functions of the 3GPP access network control function; and
- exchanging messages with the first controllable function in accordance with the subscription to the first controllable function and with the second controllable function in accordance with the subscription to the second controllable function.

17. The method of claim 16, wherein the 3GPP access network control function comprises gNodeB and wherein the non-3GPP access network control function comprises one of Non-3GPP Interworking Function (N3IWF), Trusted Network Gateway Function (TNGF), Trusted Wireless Local Area Network (WLAN) Interworking Function (TWIF), or Wireline Access Gateway Function (W-AGF).

18. The method of claim 16, wherein the first plurality of controllable functions and the second plurality of controllable functions comprise one or more of a radio resource management function, an admission control function, a slicing function, a resource allocation function, a mobility management function, an authentication function, an authorization function, an identity management function, an access management function, a security management function, a user plane function, a control plane function, a Quality-of-Service (QOS) function, or a 3GPP core network interface function.

19. The method of claim 16, wherein the non-3GPP access network control function sends a connection setup request to establish a communication session with the access network intelligent controller, wherein the connection setup request includes an identifier for the non-3GPP access network control function that uniquely identifies the non-3GPP access network control function.

20. Non-transitory computer-readable media medium having instructions stored thereon, that when executed, cause one or more processors of an access network intelligent controller to:
- receive, from a non-3GPP access network control function, a connection setup request to establish a communication session with the access network intelligent controller, wherein the connection setup request includes an identifier for the non-3GPP access network control function that uniquely identifies the non-3GPP access network control function within a network system;
- instantiate one or more applications, wherein an application of the one or more applications is configured to:
  - issue a first subscription request for a subscription to a first controllable function of a first plurality of controllable functions of the non-3GPP access network control function;
  - issue a second subscription request for a subscription to a second controllable function of a second plurality of controllable functions of a 3GPP access network control function, wherein the access network intelligent controller is configured to communicate with the 3GPP access network control function and the non-3GPP access network control function;
  - exchange messages with the first controllable function in accordance with the subscription to the first controllable function and with the second controllable function in accordance with the subscription to the second controllable function.

\* \* \* \* \*